UNITED STATES PATENT OFFICE.

AMOS S. PARKE, OF BAY CITY, MICHIGAN.

PUMP-PISTON.

SPECIFICATION forming part of Letters Patent No. 279,663, dated June 19, 1883.

Application filed December 29, 1882. (No model.)

*To all whom it may concern:*

Be it known that I, AMOS S. PARKE, of Bay City, in the county of Bay and State of Michigan, have invented certain new and useful Improvements in Pistons for Deep-Well Pumps; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of my improved piston. Fig. 2 is a side view of part of the same with a portion of the packing-rings and jam-collars broken away. Fig. 3 is a cross-section through the line $xx$ in Fig. 1, and Fig. 4 is a similar view through line $yy$ in Fig. 1.

Like letters of reference indicate corresponding parts in the several figures.

My invention has relation to pump-valves; and it consists in the improved construction and combination of parts of a valve or piston, which is specially adapted for deep-well pump-barrels, as hereinafter more fully described and claimed.

In the accompanying drawings, the letter A denotes the cylindrical body of my improved valve or piston, which is open at the bottom, while its upper end is threaded on the outside to receive the threaded jam-collars D D', the lowermost, D', of which has an annular shoulder or offset, $d$, for the purpose hereinafter set forth.

Upon the top of valve-body A is screwed the valve-cage E, bearing with its lower rim against the uppermost jam-collar, D, and having a threaded stem, E', for connecting it to the sucker-rods.

F is a ball-valve placed inside of the cage, and working against a seat, $f$, in the upper end of the piston.

B B are packing-rings, made of steel or other suitable metal, which have oblique slots $s$ for the purpose of permitting the rings to expand in the well-tube. The top and bottom rims of each ring are turned off to form an annular shoulder or offset, $b$, as clearly shown in Figs. 1 and 2.

Arranged between the expansible packing-rings B B are counterbored collars C, bored so as to fit the shouldered rims $b$ of the packing-rings, and adapted to slide upon the outside of the cylindrical valve-body. By this construction and combination of the shouldered packing-rings B and counterbored collars C in conjunction with the jam-collars D and D', shouldered at $d$, the rings will be held in place upon the piston in the event of their being split or broken, inasmuch as their shouldered upper and lower rims are firmly locked between the counterbored collars C, interposed between each pair of rings. Thus I effectually overcome the objection heretofore urged against this class of packing for deep-well pump-pistons—viz., that if any of the rings should break they will fall off the valve into the pump-barrel, and choke it up or otherwise interfere with its satisfactory working, when the piston is lifted out of the barrel. This cannot happen with the shouldered rings and counterbored collars, which are locked tightly against one another by screwing down the jam-rings D' and D, which encircle the upper threaded part of the piston-body A.

In the present illustration of my invention I have shown the piston constructed with a ball-valve confined within the valve-cage E; but it is obvious that any other style of valve may be used without in the least affecting the arrangement and operation of the packing-rings and collars interposed between them.

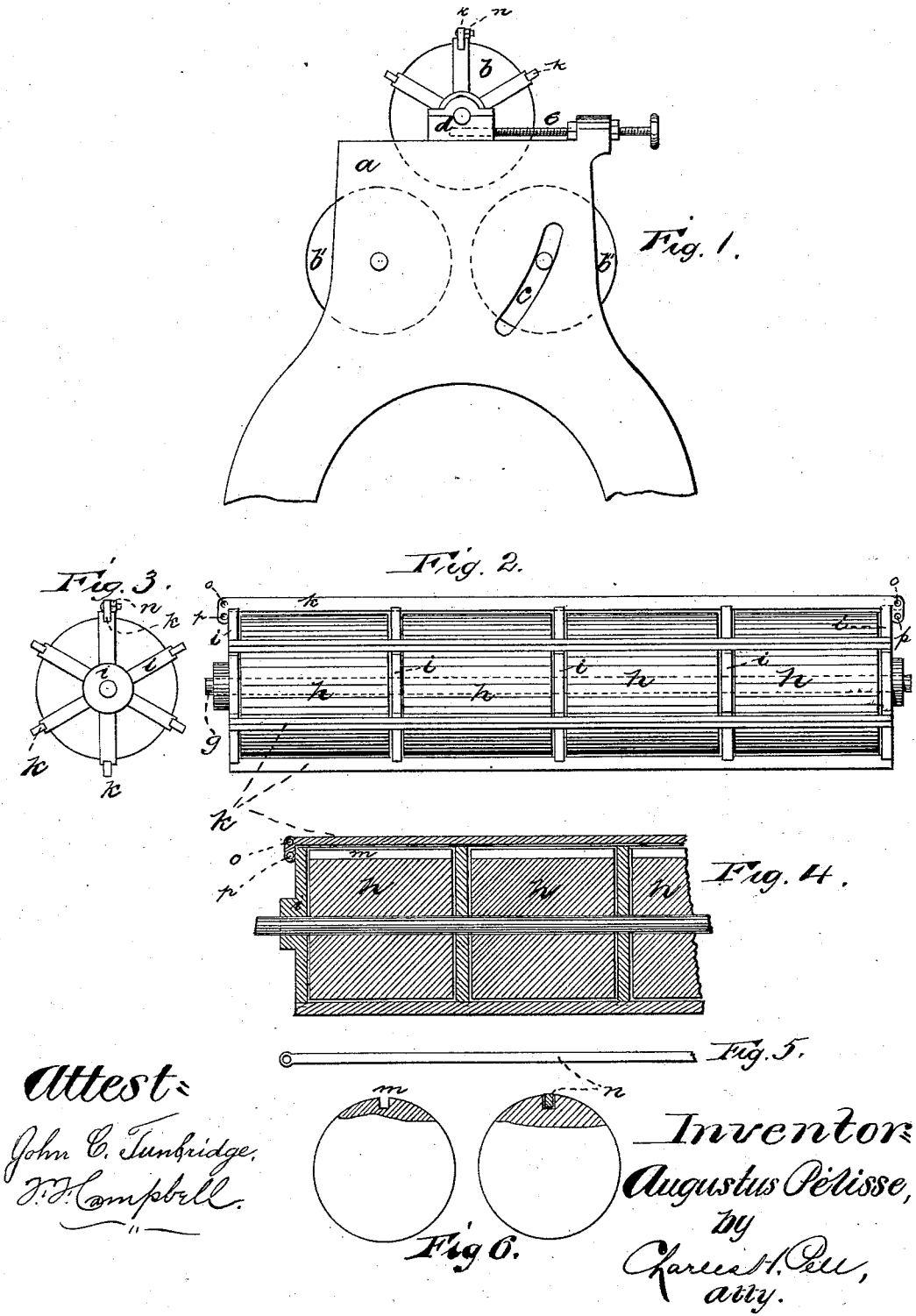

Having thus described my invention, I claim and desire to secure by Letters Patent of the United States—

1. The metallic packing-rings B, having oblique slots $s$, and turned at the top and bottom to form annular shoulders $b\ b$, substantially as and for the purpose shown and set forth.

2. The combination, in a pump-piston of the slotted packing-rings B, having shoulders $b\ b$ at the top and bottom, and collars C, interposed between each pair of rings and counterbored to interlock with their shoulders $b$, substantially as and for the purpose shown and set forth.

3. The improved piston for deep-well pumps herein shown and described, consisting of the cylindrical body A, screw-threaded at its up-